(12) United States Patent  (10) Patent No.: US 6,408,909 B1
Nguyen  (45) Date of Patent: Jun. 25, 2002

(54) RADIAL RUNFLAT PASSENGER TIRE WITH IMPROVED TREAD CONTOUR WITH DECOUPLING GROOVES

(75) Inventor: Gia Van Nguyen, Rossignol (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/554,469
(22) PCT Filed: Jan. 15, 1998
(86) PCT No.: PCT/US98/00717
§ 371 (c)(1),
(2), (4) Date: May 11, 2000
(87) PCT Pub. No.: WO99/36278
PCT Pub. Date: Jul. 22, 1999

(51) Int. Cl.[7] .......................... B60C 9/00; B60C 11/11; B60C 17/00; B60C 101/02; B60C 115/00
(52) U.S. Cl. ........................ 152/209.14; 152/209.16; 152/209.28; 152/517; 152/555; 152/557
(58) Field of Search ................ 152/209.14, 209.18, 152/209.26, 209.28, 454, 517, 555, 557

(56) References Cited

U.S. PATENT DOCUMENTS

| 3,245,454 A | * | 4/1966 | Lewis .......................... 152/557 |
| 3,540,511 A | * | 11/1970 | Mirtain ........................ 152/557 |
| 3,682,220 A | * | 8/1972 | Verdier ................... 152/209.26 |
| 4,756,352 A | | 7/1988 | Ogawa et al. |
| 5,176,768 A | | 1/1993 | Hanada et al. |
| 5,222,537 A | * | 6/1993 | Saito et al. ............. 152/209.14 |
| 5,247,979 A | | 9/1993 | Asano |
| 5,337,815 A | * | 8/1994 | Graas ..................... 152/209.28 |
| 5,421,389 A | * | 6/1995 | Favre et al. ............ 152/209.28 |
| 5,511,599 A | * | 4/1996 | Willard ....................... 152/517 |
| 5,567,253 A | * | 10/1996 | Iwamura ................. 152/209.28 |
| 5,630,892 A | | 5/1997 | Williams et al. |
| 5,630,893 A | | 5/1997 | Williams et al. |
| 5,647,925 A | | 7/1997 | Sumiya et al. |
| 5,660,652 A | | 8/1997 | Young et al. |
| 5,871,600 A | * | 2/1999 | Oare et al. .................. 152/546 |

FOREIGN PATENT DOCUMENTS

| EP | 0424155 | | 4/1991 | |
| FR | 2128232 | | 10/1972 | |
| JP | 3-132402 | * | 6/1991 | ............ 152/209.26 |
| JP | 5-262105 | | 10/1993 | |

* cited by examiner

Primary Examiner—Steven D. Maki
(74) Attorney, Agent, or Firm—Howard M. Cohn

(57) ABSTRACT

A passenger tire having a tread, a casing with two sidewalls, one or more radial plies extending from and wrapped about two annular beads and a belt reinforcement structure located radially between the tread and the plies. The tread has a central rib with a first contour-defining curve extending outwards from the mid centerline of the tire towards the sidewalls and a pair of side ribs each having a second contour-defining curve disposed between the central rib and the sidewalls. The first and second contour-defining curves each have first and second radii disposed such that the meeting point of first and second adjacent contour-defining curves cannot contain a single line that is mutually tangential to the first and second adjacent contour-defining curves. First and second circumferential decoupling grooves are disposed on either side of the centerline at the meeting point of the first and second adjacent contour-defining curves, and define a circumferential line at the bottom of the grooves which is a region of greater flexibility than the adjacent ribs of the tire tread to decouple a sidewall bending stresses from the central rib.

5 Claims, 7 Drawing Sheets

FOOTPRINT PRESSURE DISTRIBUTION

RADIAL RUNFLAT PASSENGER TIRE WITH IMPROVED TREAD CONTOUR WITH DECOUPLING GROOVES

TECHNICAL FIELD

The present invention relates to an improved tread contour for radial ply passenger vehicle tires and more specifically to the tread contour of types of radial passenger vehicle tires that include conventional tires, tires capable of being used in the uninflated condition, and tires constructed with plies reinforced with cords having a modulus of greater than 100 GPa.

BACKGROUND OF THE INVENTION

Treads designed specifically for the passenger vehicles have been designed such that the cross-sectional contour of the tread has been defined according to multiple radii of curvature which are joined in such a way that adjacent curves. meet one another tangentially, i.e., without discontinuity in the axially directed curvature of the tread. With this method, to fit a required drop to a tread contour (i.e., drop as measured from the centerline to the shoulder of the tire) with one or more radii, the tread contour shape required one or more curves with low radius of curvature. The result of this design criteria was a footprint shape factor that provided a satisfactory pressure distribution across the footprint during both straight and turning driving patterns.

In the particular case of runflat type tires having generally thicker sidewalls than conventional tires, if the tread shoulder contours are described by tangentially joined adjacent curves having smaller radii of curvature in the regions of the tread shoulders than the radii of curvature in the central tread portion, bending stresses tend to be transmitted from the sidewalls to the tread during conditions of low to zero air pressure in the tire. The effect of this bending stress between the sidewalls and the tread is to cause inward buckling of center portion of the tread, the result of which is that the center portion of the tread receives little to none of the tire's load when the tire's pressure is low to zero. One result of this inward buckling of the tread during runflat conditions is the potential for reduced vehicle handling characteristics in straight-run operation and, especially, in cornering. Another result is shorter operational life of the tread in the runflat condition, due to the cycling of severe inward bending stresses in the tread center. Yet another result associated with tire operation in the runflat condition is the tendency for the shoulders of the tire to come into contact with the road, causing yet further reduction of optimal handling in straight line operation and especially in cornering.

The adverse effects of tread contours defined by tangentially adjacent circular curves described in the paragraph above in relation to runflat tires apply generally to all tires that have tread contours which are defined by tangentially adjacent circular curves.

European Patent Application EP-A-0 424 155, (Sumitomo Rubber Industries Limited, filed Oct. 18, 1990, discloses a pneumatic radial tyre in which the tread surface is formed along a curvature plane which includes a first arc with a radius R1, a second arc with a radius R2, a third arc with a radius R3, and a main circumferential groove.

The development of tires with a high modulus carcass, containing, for example, wire cords in the ply, leads to tire treads that tend not to flatten in a way that optimally distributes the loading on the ground; more specifically, a high modulus carcass having low radii of curvature tread contour shapes in the shoulder region, as conventionally desired to achieve the required drop, tends to cause the tire's load to be disproportionately borne by the shoulders and sides of the tread. This leads to less than optimal footprint pressure distribution in straight driving and to low footprint contact surface in cornering. More specifically, conventional design criterion can result in less than optimal wear characteristics, and less than optimal handling and ride characteristics that correspond to a footprint shape factor in which excessive portions of the tire's load are carried by the outer-most portions of the tread. It would be desirable to provide a tread contour shape being more evenly distributed across the entire tread width in such a way as to yield a satisfactory footprint shape factor.

OBJECTS OF THE INVENTION

An object of the present invention is to provide a low-aspect ratio passenger-vehicle tire having a tread design that gives long tire life, good handling and satisfactory ride as a result of a tread design having decoupling grooves which define a circumferential line at the bottom thereof which is a region of great flexibility to decouple sidewall bending stresses from the central ribs of the tire.

Another object of the present invention is to provide circumferential decoupling grooves at the meeting point of adjacent contour-defining curves of ribs that cannot contain a single line which is mutually tangent to the contour defining curves so as to enable a large area of contact between the tire tread and the road on runflat radial tires.

Still another object of the present invention is to enable a large area of contact between the tire tread and the road on radial tires in which the radial plies include high modulus reinforcing cords and the tread incorporates the decoupling grooves of the present invention.

Yet another object of the invention is to enable a large area of contact between the tire tread and the road on radial tires having more or less conventional carcass design and construction.

SUMMARY OF THE INVENTION

The present invention relates to a pneumatic radial ply passenger tire having a tread, a casing with two sidewalls, one or more radial plies extending from and wrapped about two annular beads and a belt reinforcement structure located radially between the tread and the plies. The tread is characterized by the tread having a central rib with a first contour-defining curve extending outwards from the mid centerline of the tire towards the sidewalls and a pair of side ribs each having a second contour-defining curve disposed between the central rib and the sidewalls. The first and second contour-defining curves each have first and second radii disposed such that the meeting point of first and second adjacent contour-defining curves cannot contain a single line that is mutually tangential to the first and second adjacent contour-defining curves. First and second circumferential decoupling grooves are disposed on either side of the mid centerline at the meeting point-of the first and second adjacent contour-defining curves. The first and second circumferential decoupling grooves, which are disposed in a bilaterally symmetrical location on either side of the mid centerline, define a circumferential line at the bottom of the first and second grooves which is a region of greater flexibility than the adjacent ribs of the tire tread to decouple sidewall bending stresses from the central rib. Further, the first and second circumferential decoupling grooves have parallel, zig-zag or sinusoid shaped, spaced side walls.

In one embodiment of the invention, the pneumatic radial ply passenger tire has sidewalls with at least one ply reinforced with cords having a modulus E of X, X being at least 10 GPa and a second ply reinforced with substantially inextensible cords having a modulus E greater than X of the cords of the other ply. In this embodiment, an insert disposed between the first and second plies in the sidewalls results in a runflat type tire. This tire can also include a second pair of ribs between the second pair of ribs and the sidewalls. Each of the second pair of ribs has a third contour-defining curve disposed between the first pair of ribs and the sidewalls. Third and fourth circumferential decoupling grooves are disposed between the second and third adjacent contour-defining curves to help decouple the sidewall stresses from the central and side ribs.

In still another embodiment, the pneumatic radial ply passenger tire has sidewalls having at least one ply reinforced with cords having a modulus of over about 100 GPa. The tire of this embodiment also incorporates the decoupling groove in accordance with the invention.

BRIEF DESCRIPTION OF THE DRAWINGS

The structure, operation and advantages of the presently preferred embodiment of the invention will become further apparent upon consideration of the following description taken in conjunction with the accompanying drawings, wherein.

DEFINITIONS

Figure 1:
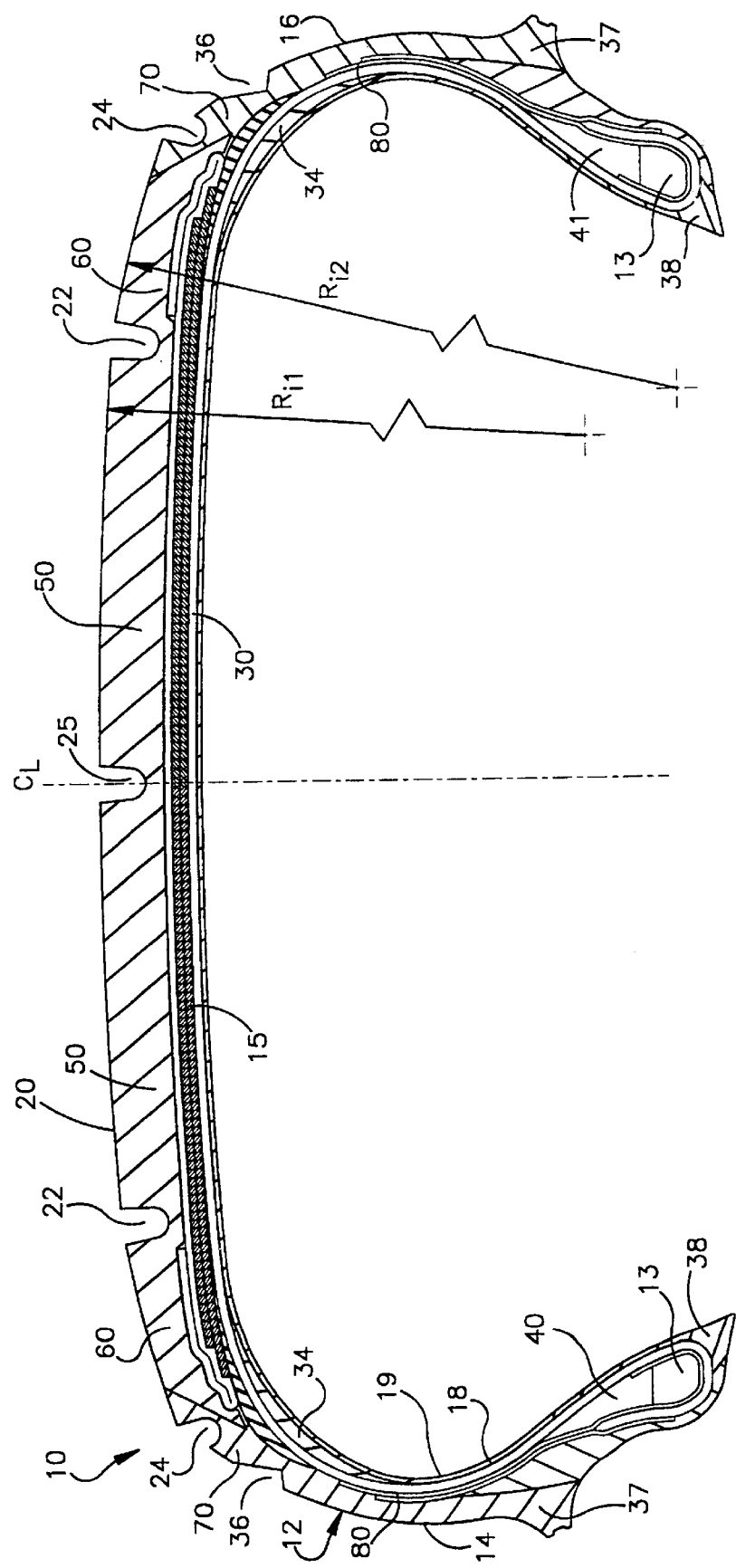
FIG. 1 is a cross-sectional view of a high modulus radial ply passenger tire according to the present invention.

"Apex" means an elastomeric filler located radially above the bead core and between the plies and the turnup ply.

"Aspect Ratio" means the ratio of the section height of a tire to its section width.

"Axial" and "axially" means the lines or directions that are parallel to the axis of rotation of the tire.

"Bead" or "Bead Core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Carcass" means the tire structure apart from the belt structure, tread, undertread, over the plies, but including the beads.

"Casing" means the carcass, belt structure, beads, sidewalls and all other components of the tire excepting the tread and undertread.

"Chafers" refers to narrow strips of material placed around the outside of the bead to protect cord plies from the rim and to distribute flexing above the rim.

"Circumferential" means lines or directions extending along the perimeter of the surface of the annular tread perpendicular to the axial direction.

"Cord" means one of the reinforcement strands of which the plies in the tire are comprised.

"Drop" means the fall off of the shoulders of the tread contour with respect to the central portion of the tread.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Footprint shape factor" is the ratio of the tire's centerline footprint length to the shoulder footprint length.

"Innerliner" means the layer or layers of elastomer or other material that form the inside surface of a tubeless tire and that contain the inflating fluid within the tire.

"Lateral" means an axial direction.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Ply" means a layer of rubber-coated parallel cords.

"Radial" and "radially" mean directions radially toward or away from the axis of rotation of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Restrictor" means that crescent-shaped portion of the carcass located between the inner liner and the inner plies and beneath the joining point of the sidewall and the shoulder of the tread and which stiffens the juncture of the tread shoulder and the sidewall.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tangential" and "tangentially" refer to segments of circular curves that intersect at a point through which can be drawn a single line that is mutually tangential to both circular segments.

"Tread contour" means the shape of a tire tread as viewed in axial cross section.

"Tread Width" means the arc length of the tread surface in the axial direction, that is, in a plane parallel to the axis of rotation of the tire.

DETAILED DESCRIPTION OF THE PREFERRED EMBODIMENT

With reference to FIG. 1, a cross section of the pneumatic radial tire 10 for use in passenger vehicles is illustrated, showing the invention. FIG. 1 shows a high modulus tire 10 incorporating the invention, though either a runflat tire, as discussed hereinbelow and illustrated in FIG. 3, or a conventional radial ply tire can equally incorporate the principles of this invention.

The tire 10 has a tread 20 and a casing 12. The casing 12 has two sidewalls 14,16, one or more radial plies 18 extending from and wrapped about two annular beads 13, and belt reinforcement structure 15 located radially between the tread 20 and the plies 18. The multiplicity of plies 18 and the belt reinforcement structure 15 are cord-reinforced elastomeric material, the cords being preferably steel wire filaments and the elastomer preferably being vulcanized rubber material. Similarly, the annular beads 13 have steel wires wrapped into a bundle known as the bead core.

The carcass 30 includes the inner liner 19, the plies 18, sidewalls 14,16, the beads 13, and a pair of apexes 40 and 41 located over the beads 13 and between the plies 18 that are folded around the beads 13. This carcass structure 30 is the foundation upon which, and contiguous with, the tread 20 resides. Carcass 30 might or might not have additional stiffeners, not shown in FIG. 1, which give the tire runflat capability. The term runflat as used in this patent means that the tire structure alone is sufficiently strong to support the vehicle load when the tire is operated in the uninflated condition, without the sidewall and internal surfaces of the tire collapsing or buckling onto themselves and without requiring any internal devices to prevent the tire from collapsing. The conventional pneumatic tire when operated without inflation collapses upon itself when supporting a vehicle load. Carcass 30 of this invention is either of a conventional or a runflat design.

A liner component of preferably halobutyl rubber forms an air-impervious inner liner 19 which seals pressurized air in tire 10 when inflated. A pair of crescent-shaped restrictors 34 traverse the region of beneath the shoulder notches 36 and are situated between inner liner 19 and at least one layer of ply 18. Restrictors 34 increase the rigidity of the carcass 30 in the region where the tread 20 joins with sidewalls 14,16 and are incorporated in a carcass having a high modulus of greater than about GPa. A pair of annular shaped wheel-rim retainer lips 37 as retain the tire on the rim when the internal tire pressure is low to zero. Chafer 38 protect cord plies from the rim, distribute flexing above the rim.

A multiplicity of rib pairs 50,60,70 are located on each side of tire centerline CL, delineated on tread 20 by center groove 25. Center-most rib pair 50 has an axial contour defined by an internal curve having radius $R_{i1}$. $R_{i1}$ is large compared to the maximum dimension of tire 20; $R_{i1}$ is on the order of about 1,000 millimeters or more. Each rib 60 is separated from adjacent rib 50 by a pair of decoupling grooves 22. The curved contour of each of the ribs 60 of rib pair 60 is defined by an internal curve having a radius of curvature $R_{i2}$ which, like $R_{i1}$, is large, i.e., not less than about 800 millimeters. Another pair of decoupling grooves 24 are situated between rib pairs 60 and 70.

Addressing now the ribs on only one side of the centerline $C_L$ of tread 20, for convenience since the operating mechanism described is equally applicable to the opposite side of the centerline $C_L$, center rib 50 makes contact with the road along the entire width of rib 50. The majority of rib 60 also makes contact with the road in normal straight-line running while the portion of rib 60 immediately adjacent to decoupling groove 24 is out of out of contact with the road.

Figure 2:
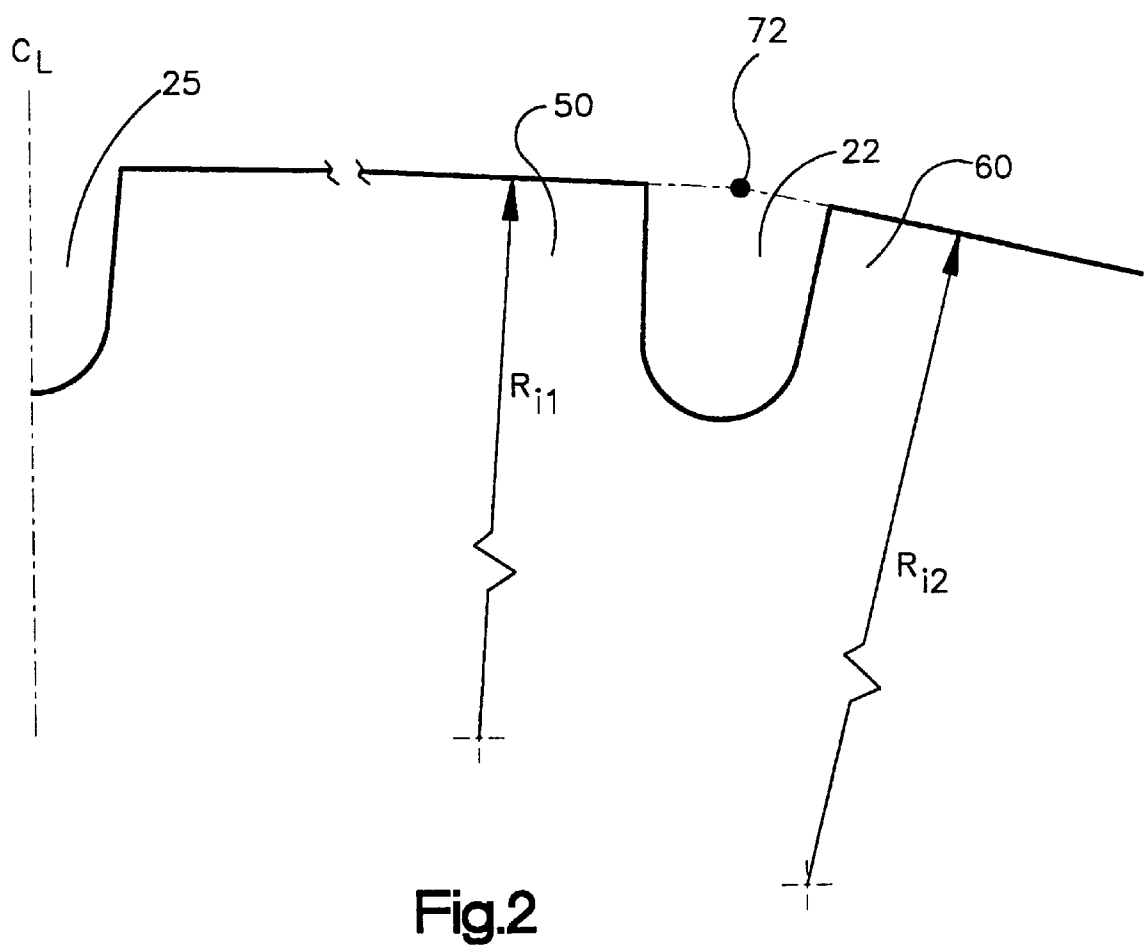
FIG. 2 is a detail of the geometric relationship of the curve-shaped tire shaped contours described by this invention.

The nature of this invention becomes evident in FIG. 2 which shows the geometric relationship of the curve-shaped contours of ribs 50 and 60 separated by circumferential decoupling groove 22 and bilaterally symmetrical about each side of centerline $C_L$. In FIG. 2, the curve-shaped contours of ribs 50 and 60, when extended over decoupling groove 22, meet in a non-tangential way at point 72, located approximately over the middle of decoupling groove 22. In other words, if the curves defined by $R_{i1}$ and $R_{i2}$ are extended to a meeting point, that point will not be commonly tangential to the respective curves of radii $R_{i1}$ and $R_{i2}$. It is important to note that circumferential decoupling groove 22 can be straight or can have other shapes such as for example zig-zag, sinusoid, but not limited to a specific shape. A preferential defining aspect of the circumferential decoupling groove 22 is that its sides are sufficiently spaced from each other so that a circumferential line of equal radius and increased radial flexibility could be drawn around the tire at the bottom of the groove channel. However, it is also within the terms of the present invention to form the circumferential decoupling groove 22 so that the sides of the groove are spaced from each other so that a circumferential line of cannot be circumferentially drawn around the tire at the bottom of the groove channel.

Figure 3:
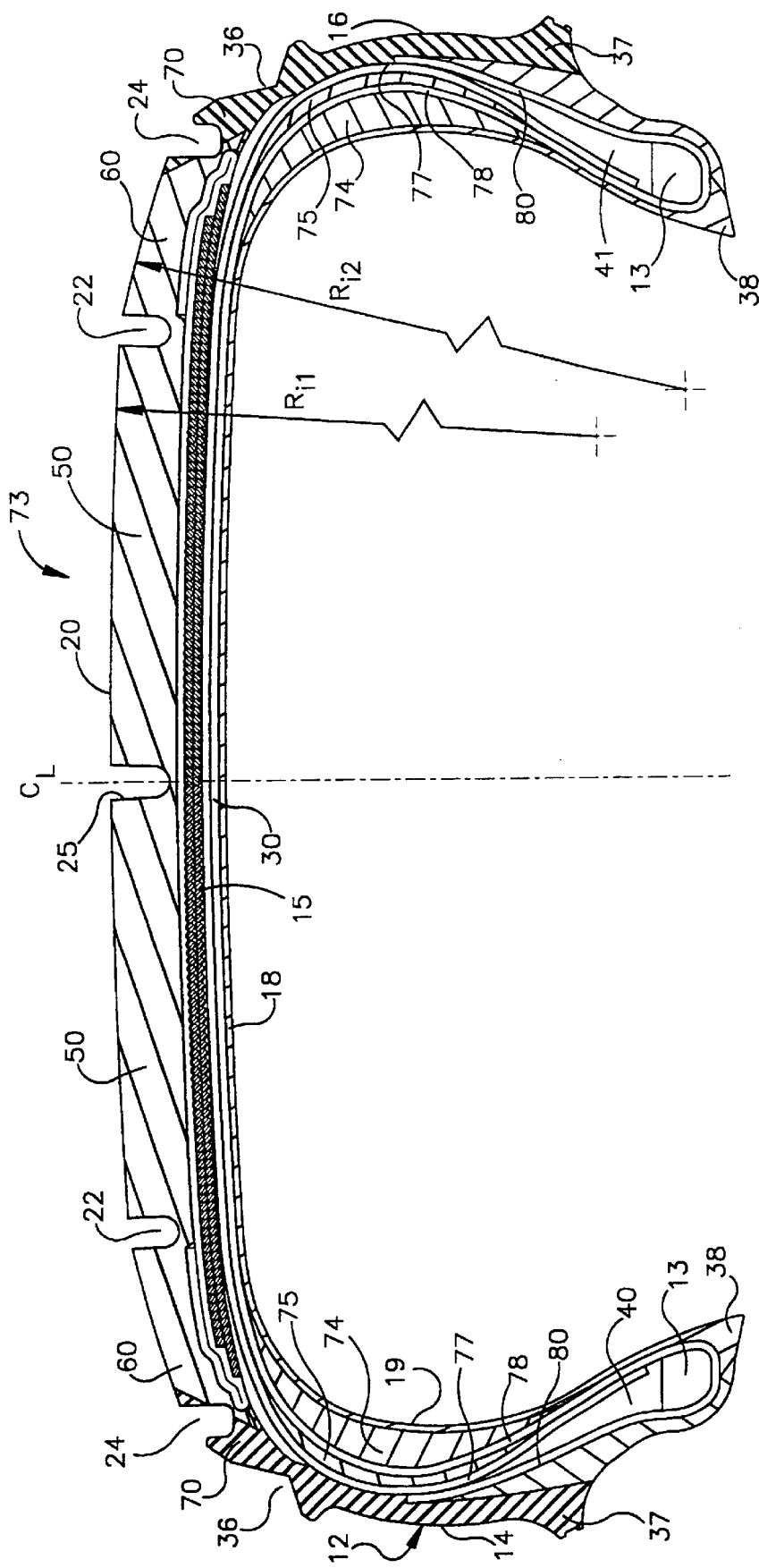
FIG. 3 is a cross-sectional view of a tire designed for extended runflat capability incorporating the features of the present invention.

FIG. 3 shows the invention as incorporated on a tire 73 have extended runflat capability made possible by the incorporation of strengthened sidewalls 14,16 having one or more fillers 74,75, which extend from each apex region 40 radially to beneath the reinforcing belt structures 15. The sidewall portions 14,16 may each include a first filler 74 and a second filler 75, as described in U.S. patent application Ser. No. 08/865,489, having a common assignee with the present invention and being incorporated in its entirety by reference hereto.

Figure 5:
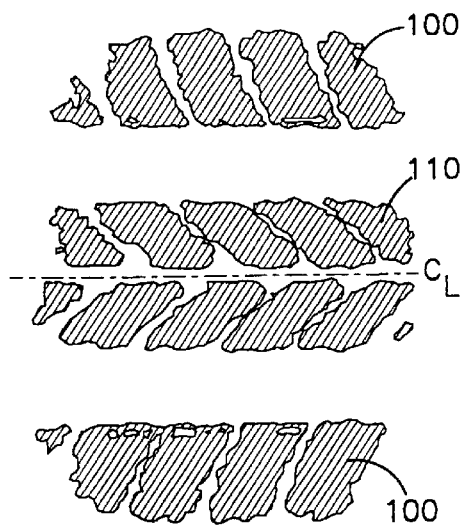
FIG. 5 shows the exemplary footprint of a high modulus tire incorporating the present invention.
Figure 6:
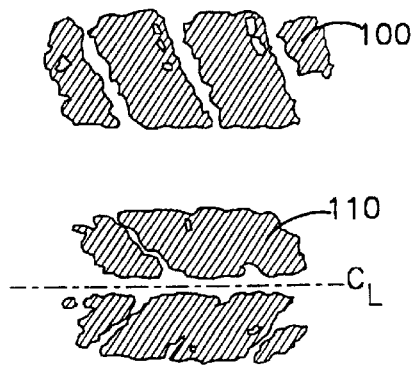
FIG. 6 shows an exemplary footprint of a high modulus tire that does not incorporate the present invention, but rather uses conventional methods of tread-contour definition.
Figure 7:
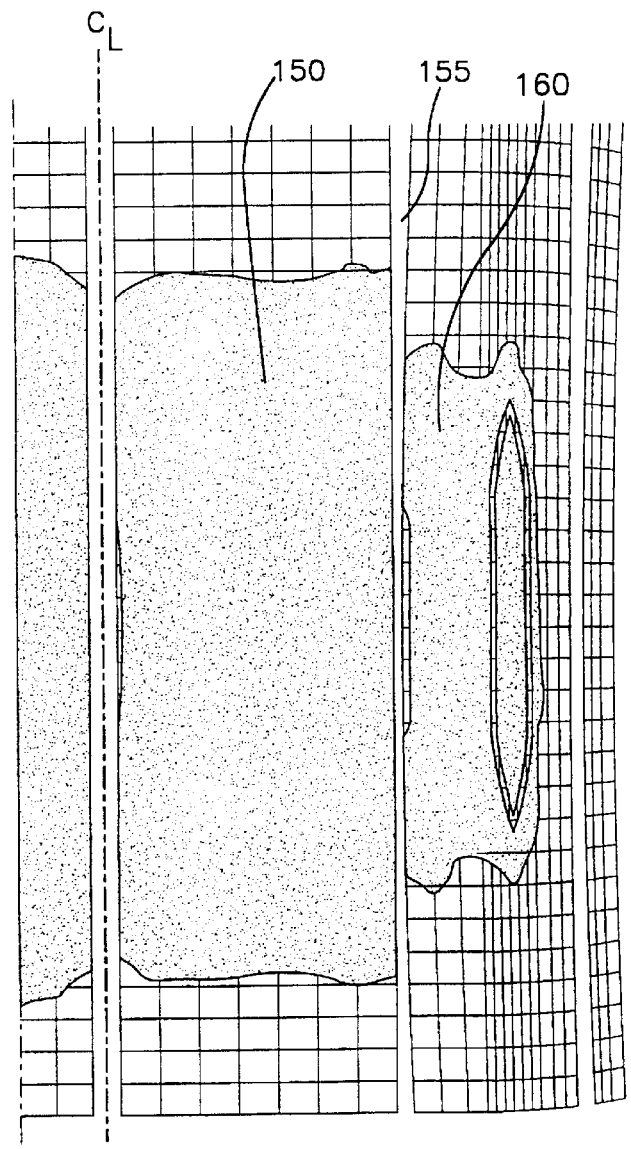
FIG. 7 shows the pressure distribution of a load bearing tire whose tread is made in conformance with the present invention.

This unique tread contour, defined by adjacent large radii $R_{i1}$ and $R_{i2}$, allows a greater degree of "drop" of rib 60 in relation to rib 50, the benefit of which will become evident upon examination of FIGS. 5, 6 and 7. The tread contour of the present invention differs from conventional tread contour designs wherein adjacent tread-contour-defining curves meet one another at points of mutual tangentiality. In other words, in conventional tires, adjacent curves with define the tread contour meet smoothly, at points having the property of being able to contain a single straight line that is tangent to any two adjacent contour-defining curves. In this invention, the meeting point of two adjacent contour-defining curves can not contain a single line that is mutually tangential to two adjacent curves.

Figure 4:
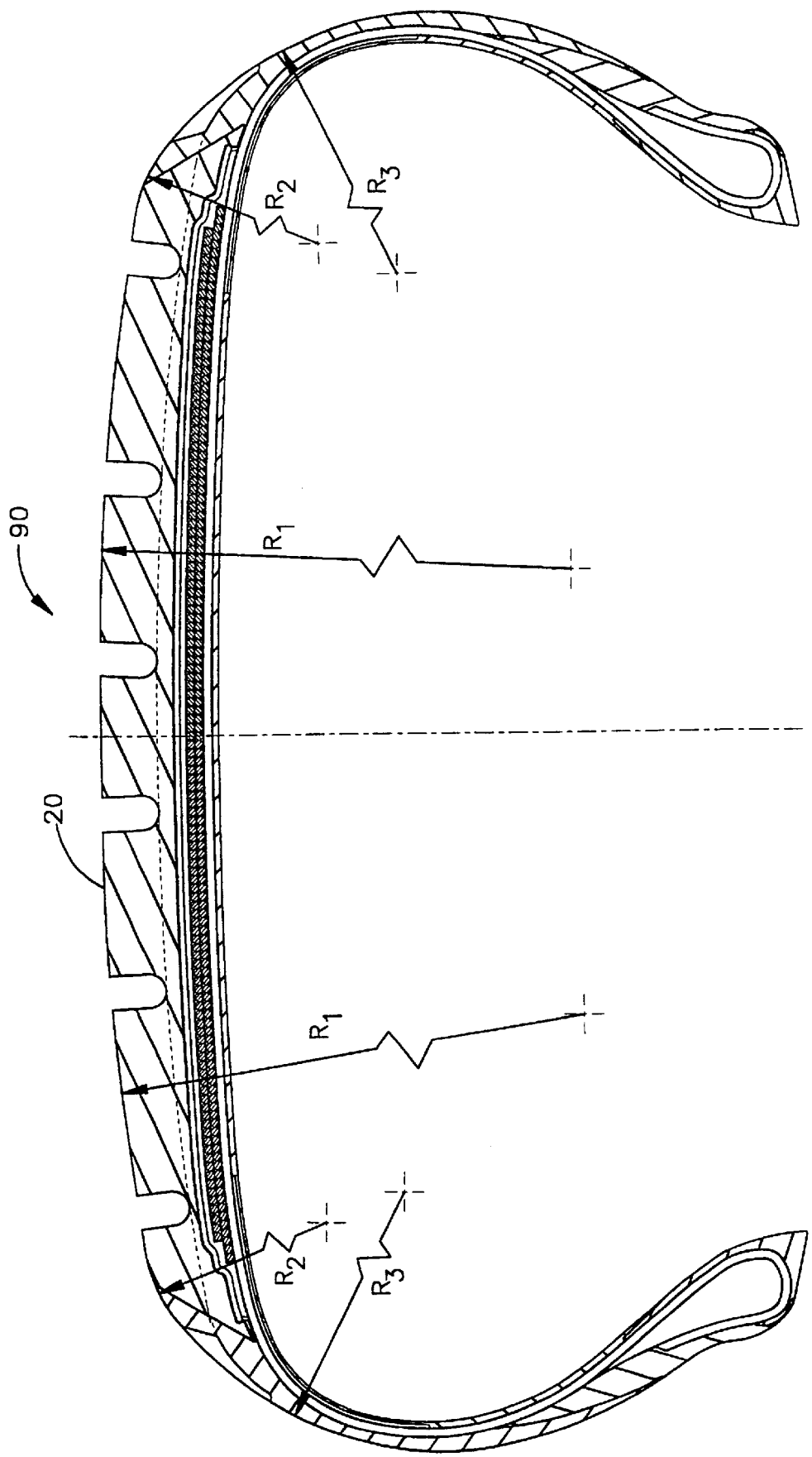
FIG. 4 is a cross-sectional view of a conventional tire tread contour for comparison with the tread contour of tires in accordance with the present invention.

In addition, in this invention, the shoulder curve of rib 60, defined by circular curve of radius $R_{i2}$ is larger than in the corresponding locations of convention tires, as illustrated in FIG. 4.

FIG. 4 shows a conventional tire tread contour 20 which is defined by multiplicities of circles defined by three exemplary radii $R_1$, $R_2$ and $R_3$. The mutually adjacent curves (not shown) generated by respective radii, such as $R_1$ and $R_2$, or by $R_2$ and $R_3$, intersect at points (not shown) at which can be drawn a single line that is mutually tangential to each adjacent curve. The present invention deviates from this conventional design in that the point of intersection of two adjacent curves cannot contain a single line that is mutually tangential to both curves.

The benefit of the present invention becomes evident in FIGS. 5 and 6, which show the exemplary footprints of tires incorporating and not incorporating, respectively, the tread-contour generating geometry described above. The footprint shape factor shown in FIG. 5, which incorporates the invention, is indicative of better road contact, e.g. a longer portion of the tread on the road, than in FIG. 6 wherein the shape factor corresponding to the same tread pattern is adversely influenced by the lesser degree of "drop" in the side tread rib, such as for example side tread rib 60 of FIG. 1. The central portion of the footprint in FIG. 6 shows that the prints 100 of the "undropped" side tread rib, (e.g. corresponding to rib 60 in FIG. 1) is bearing sufficient load to remove load from the center print 110. In other words, FIG. 6 shows the footprint shape factor associated with conventional tread-contour design in which the adjacent center and side ribs, e.g. corresponding to ribs 50 and 60 in FIG. 1, are defined by curves which intersect tangentially.

FIG. 7 shows the pressure distribution of a load bearing tire whose tread is made in conformance with this invention. The footprint pressure distribution 150 of a central rib corresponds to the longer center portion 110 of FIG. 5, while the shorter footprint pressure distribution 160 of a side rib corresponds to the outer portion 100 of FIG. 5. The zone 155 between pressure distribution zones 150 and 160 corresponds to decoupling groove 22.

Figure 8:
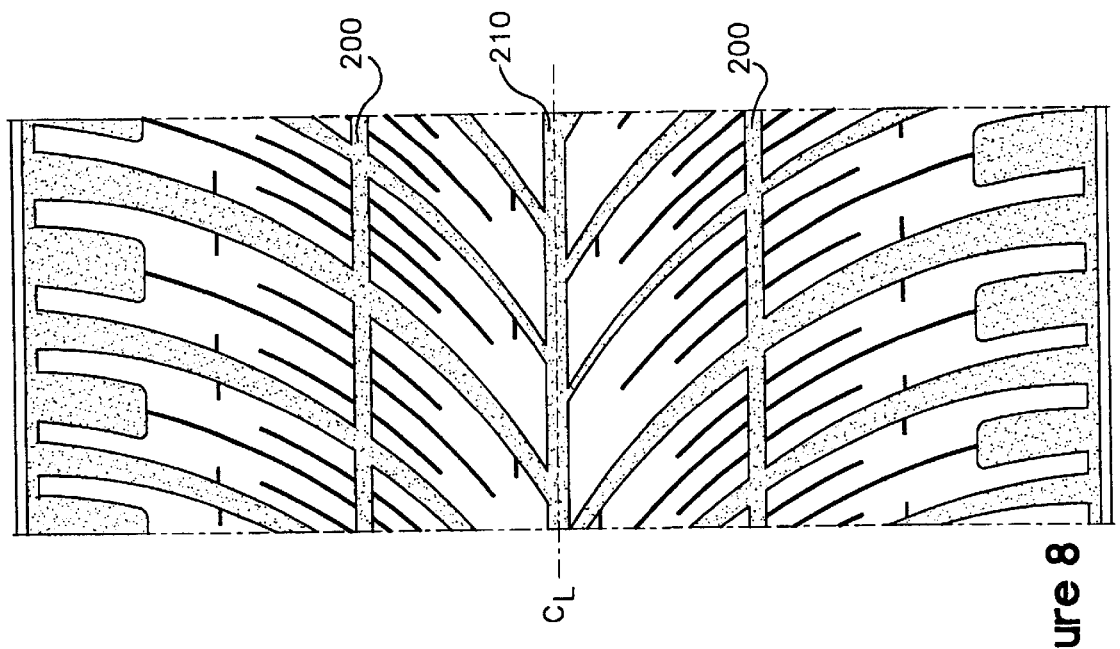
FIG. 8 shows an orthogonal view of an exemplary tread pattern in which the decoupling grooves of the present invention are substantially straight.

FIG. 8 is an orthogonal view of an exemplary tread pattern in which the pair of circumferential decoupling grooves 200 correspond to decoupling grooves 22 and center groove 210 corresponds to center groove 25 in FIGS. 1, 2 and 3. While a center circumferential groove is disposed at the center line of the tread contour, the provision of a center groove is not necessary and does not form a part of the present invention. In fact, other grooves can be provided in the center rib as needed. The circumferential decoupling grooves 200 are shown as being substantially straight-sided.

Figure 9:
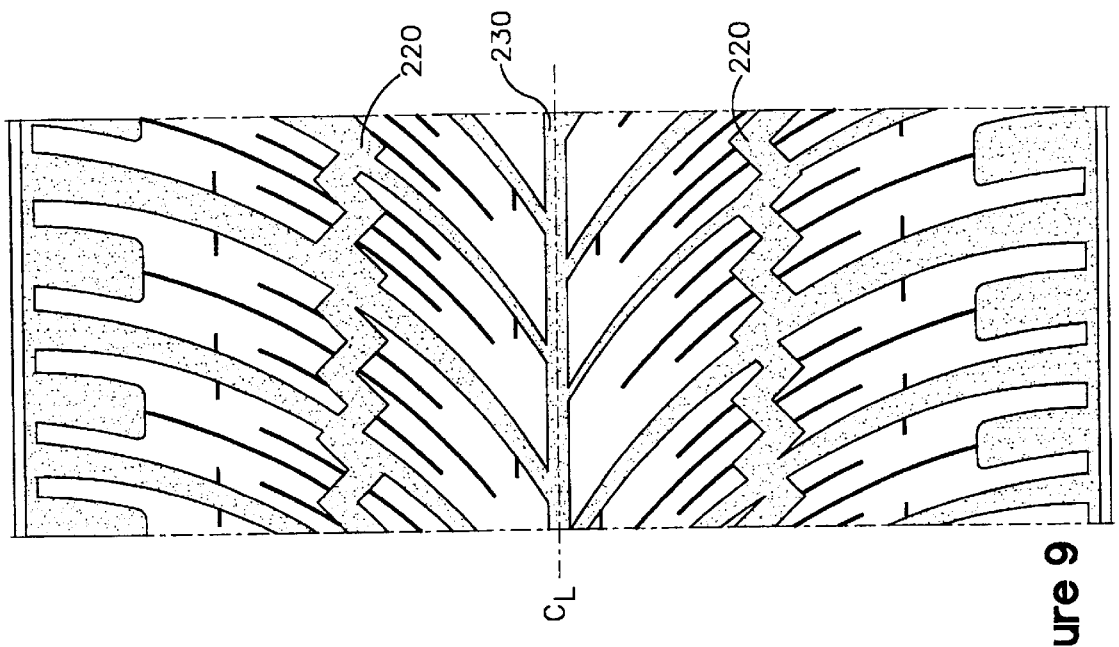
FIG. 9 shows an orthogonal view of an exemplary tread pattern in which the which decoupling grooves of the present invention are zig-zagged.

FIG. 9 is an orthogonal view of an exemplary tread pattern in which the pair of grooves 220 correspond to decoupling grooves 22 and center groove 230 corresponds to center groove 25 in FIGS. 1, 2 and 3. The decoupling grooves 220 are shown as having sidewalls being zig-zagged. While a specific zig-zag construction is illustrated, it is within the terms of the present invention to use any other zig-zag or sinusoidal pattern. As previously mentioned the decoupling grooves 200 and 220 preferably define a circumferential line at the bottom of the groove which is a region of greater flexibility than the adjacent ribs of the tire tread.

Embodiment One

Referring to FIG. 3, there is illustrated a first embodiment of the invention incorporating a runflat tire 73. An example of this embodiment is the Goodyear runflat radial ply pneumatic tire model 235/40ZR18 Eagle F1/EMT passenger vehicle tire. This low aspect ratio runflat radial ply pneumatic tire 73 has a high modulus carcass 30; a pair of sidewalls 14,16, each sidewall being reinforced with at least two sidewall fillers or inserts 74,75; at least two cord reinforced plies 77,78; and a bead core 13. The carcass 30 has one or more reinforcing belts 15. Each sidewall has at least one ply 77 or 78 reinforced with cords having a modulus E of X, X being at least 10 GPa. At least one ply has a turnup end 80 wrapped around the bead core 13. A second ply 77 or 78 is reinforced with substantially inextensible cords having a modulus E greater than X of the cords of the other ply. The second ply 77 or 78 is spaced from the first ply 77 or 78 by the second filler or insert 75 in the sidewalls 14,16.

The present invention, in combination with such runflat tire designs incorporating a high modulus carcass, gives increased tread contact during conditions of low pressure or zero pressure in the tire as well as during driving with normal tire inflation conditions. Under straight-driving, runflat conditions, ribs 60 will completely contact the ground, while decoupling groves 22 and 24, as well as shoulder notch 36, will work together to decouple sidewall bending stresses which would otherwise tend to cause the middle of tread 20 to buckle inward toward the center of rotation of the tire under conditions of low to zero tire pressure. Further, even during regular driving conditions, the high radius of curvature of the ribs 60, in combination with decoupling grooves 22 will allow increased footprint contact of both ribs 60 during cornering as compared to the ribs 80 in the tire in FIG. 4.

Embodiment Two

Referring to FIGURE. 1, there is illustrated a second embodiment of the invention used in conjunction with a tire having a high modulus carcass incorporating substantially inextensible ply cords. An example of this embodiment is the Goodyear radial ply pneumatic tire model 195/50R15 AQUASTEEL passenger vehicle tire. This radial ply pneumatic tire 10 having a high modulus carcass 30 has a pair of sidewalls 14,16, each sidewall having one or more reinforced radial plies 18 and a bead core 13. The carcass has one or more reinforcing belts 15. Each sidewall has at least one of the multiplicity of plies 18 reinforced with high modulus, e.g. over 100 GPa, cords. At least one ply has a turnup end 80 wrapped around the bead core 13.

The present invention, in combination with tire designs incorporating a high modulus carcass constructed with one or more plies reinforced with high modulus cords, gives improved tread contact during conditions of normal inflation pressure in the tire. The side ribs 60, which form the tread near the sidewalls 12, can have a radius defined by a larger radius of curvature than is used on conventional tires in which the tread contour is defined by adjacent low-radius curves that join one another tangentially. Tire tread contours which are defined by high-radius, nontangentially joined circular curves (i.e., treads defined in accordance with this invention) enable more of the tire tread to be in contact with the road during both straight driving and in cornering, which improves the handling characteristics of the tire. That is, under both straight and cornering driving conditions, both rib pairs 50 and 60 will be able to either completely and/or at least substantially contact the ground because decoupling groves 22 and 24, as well as shoulder notch 36, will work together to decouple sidewall bending stresses which otherwise would tend to cause a disproportionate amount of the load carried in the footprint to be carried by the outer ribs 60 as compared with the center ribs 50 of tire 10.

Embodiment Three

Figure 10:
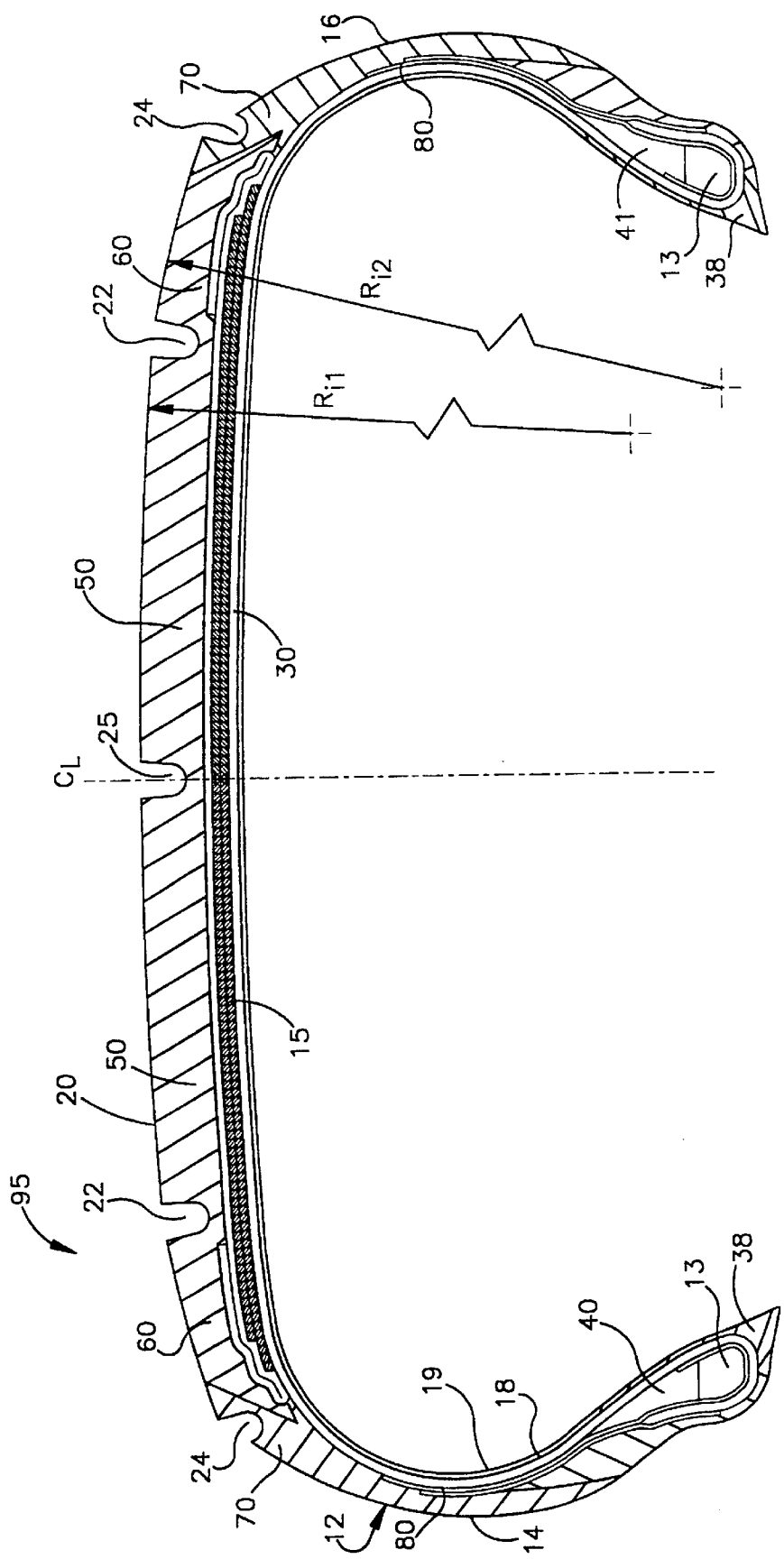
FIG. 10 shows a cross-sectional view of a conventional radial ply tire which incorporates the features of the present invention.

Referring to FIG. 10, there is illustrated a third embodiment of the invention incorporated in a conventional radial ply passenger tire 95. This carcass has one or more reinforcing belts 15, and one or more radial plies 18 reinforced with cords having a modulus E of X, X being at least 10 GPa, but not necessarily having a high modulus as in Embodiments One and Two.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A pneumatic radial ply runflat passenger tire having a tread, two sidewalls, one or more plies extending from and wrapped about two annular bends and a belt structure located radially between the tread and the plies, the tread having a center rib and a pair of side ribs separated from the center rib by a circumferential decoupling groove and a circumferential second decoupling groove;

the center rib having a first axial contour having a first radius, and the pair of side ribs each having a second axial contour sharing the same second radius;

the tire characterized by;

the first radius being larger than the second radius;

the first axial contour intersecting the second axial contours nontangentially at first and second meeting points, each of which meeting points forms a circle around the tread that is on a plane that is parallel with a equatorial plane of the tire;

the first and second decoupling grooves each having a pair of sides that are either zig-zag or sinusoidal and are suitably disposed and spaced from each other such that the circle of the first meeting point is axially between the pair of sides of the first decoupling groove, and the circle of the second meeting point is axially between the pair of sides of the second decoupling groove; and the sidewalls having at least a first ply reinforced with cords having a modulus of at least 10 GPa and a second ply reinforced with cords having a modulus greater than the modulus of the cords of the first ply, and an insert disposed in the sidewalls between the first and second plies.

2. The tire of claim 1 further characterized by the first and second decoupling grooves being disposed in a bilaterally symmetrical location of either side of a tire centerline.

3. The tire of claim 1 further characterized by the first and second decoupling grooves having parallel side walls.

4. The tire of claim 1 further characterized by the tread having a pair of outer ribs disposed on either side of, and axially outerward from, the pair of side ribs, and separated from the side ribs by third and fourth decoupling grooves.

5. The tire of claim 1 further characterized by:

the sidewalls having at least one ply reinforced with cords having a modulus of over 100 GPa.

* * * * *